(12) United States Patent
Rabnawaz

(10) Patent No.: US 11,015,009 B2
(45) Date of Patent: May 25, 2021

(54) RUBBERY UNSATURATED POLYCARBONATES

(71) Applicant: BOARD OF TRUSTEES OF MICHIGAN STATE UNIVERSITY, East Lansing, MI (US)

(72) Inventor: Muhammad Rabnawaz, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 141 days.

(21) Appl. No.: 15/983,312

(22) Filed: May 18, 2018

(65) Prior Publication Data

US 2018/0334522 A1 Nov. 22, 2018

Related U.S. Application Data

(60) Provisional application No. 62/508,597, filed on May 19, 2017.

(51) Int. Cl.
*C08F 283/02* (2006.01)
*C08G 64/34* (2006.01)
*C08G 64/02* (2006.01)

(52) U.S. Cl.
CPC ........ *C08F 283/02* (2013.01); *C08G 64/0291* (2013.01); *C08G 64/34* (2013.01)

(58) Field of Classification Search
CPC .... C08F 283/02; C08G 64/0291; C08G 64/34
USPC ........................................................ 524/565
See application file for complete search history.

(56) References Cited

U.S. PATENT DOCUMENTS

2018/0298251 A1* 10/2018 Miyazaki ............... C09J 169/00

FOREIGN PATENT DOCUMENTS

WO WO-2016208281 A1 * 12/2016 ............ C09J 169/00

OTHER PUBLICATIONS

Olsen et al. ["Cyclic allylic carbonates as a renewable platform for protecting chemistry in water", Green Chemistry (2018), 20(14), 3186-3190] (Year: 2018).*
Zhang et al. [Synthesis and properties of carbon dioxide based terpolymers bearing unsaturated double bonds, Gaofenzi Xuebao (2005), (4), 571-573] (Year: 2005).*

* cited by examiner

*Primary Examiner* — Kelechi C Egwim
(74) *Attorney, Agent, or Firm* — Marshall, Gerstein & Borun LLP

(57) ABSTRACT

An unsaturated polycarbonate has the structure:

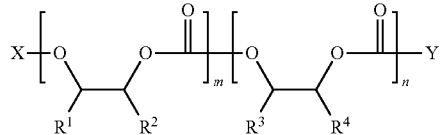

wherein X and Y are each an OH group; a transition metal and an OH group; an OH group and a COOH group; or one or both of X and Y is independently —NH2, —SH, C=C, N3, C—C triple bond, C=C, an o-tosylate, or a halogen;
m is 0 to 30,000 and n is 1 to 30,000, and (m+n) is 2 or greater;
$R^1$ is a $C_3$-$C_{20}$ group chosen from particular groups;
$R^2$ is H or a second similar $C_3$-$C_{20}$ group, and
$R^3$ is optionally a third $C_3$-$C_{20}$ group having one or more C=C terminal and/or internal double bonds; and
$R^4$ is optionally H or a fourth similar $C_3$-$C_{20}$ group optionally having one or more C=C terminal and/or internal double bonds; or
$R^3$ and $R^4$ form a ring structure having one or more C=C double bonds and having 4 to 20 carbon atoms.

31 Claims, 2 Drawing Sheets

RUBBERY UNSATURATED POLYCARBONATES

CROSS-REFERENCE TO RELATED APPLICATION

The present invention claims priority under 35 U.S.C. 0.119 to U.S. Provisional Application No. 62/508,597 filed May 19, 2017, which is incorporated herein by reference in its entirety.

STATEMENT OF GOVERNMENT INTEREST

None.

FIELD OF THE DISCLOSURE

This disclosure generally relates to the synthesis of rubbery unsaturated polycarbonates (uPCs) having one or more C=C groups pendent on the backbone. This disclosure also relates to preparing the uPCs through an energy efficient addition polymerization and to radically polymerizing the uPCs with unsaturated monomers to form unique articles.

BACKGROUND

Delicate and expensive products such as handheld electronic devices are easily shattered due to accidental impact. To prevent these losses, protective casings are often used to ensure safe usage of these expensive devices. These protective casing are typically made of high-impact materials, which are special polymer blends prepared by incorporating rubbery polymeric phase dispersed into a glassy polymeric matrix. The rubbery phase is responsible for absorbing shock energy during an impact, while the glassy phase renders structural integrity at a wide range of temperatures. High-impact polystyrene is commonly used for impact-resistant materials because it incorporates polystyrene as the glassy component and polybutadiene (PB) as a rubbery component. PBs are rubbery down to −60° C. and thus are effective shock absorbers at temperatures above −60° C., but are brittle below this temperature.

Polybutadiene is also widely used in the preparation of high-impact materials (such as high-impact polystyrene, HIPS), toys (such as LEGOs), 3D printing filaments and styrene-butadiene (SB) latex. Approximately, 2 million metric tons of SB latex is produced annually for coating applications. Similarly, toys are themselves a major industry, and LEGO Inc. alone generates over 60 billion LEGO pieces, which are prepared by the copolymerization of PB, styrene, and acrylonitrile. High-impact polystyrene (HIPS) had an annual production of 6.3 million tons in 2014 and is used for packaging as well as for protective casings for mobile devices. There are 2.6 billion smartphones units currently in the market (each being replaced with an average lifetime of 4.7 years), and this number is increasing dramatically because of the digital revolution. Therefore, there remains an opportunity for improvement relative to the manufacture of low-cost and sustainable high impact materials as an alternative to the existing HIPS.

Despite the promising applications of PB, it has some serious limitations. First, PB is derived from non-renewable and rapidly depleting raw petroleum and is thus non-sustainable. Also, petroleum prices are highly unpredictable, and thus they their costs may increase dramatically in the future. Second, PB is non-degradable and thus it places a strain on landfills and the environment. These and other challenges have triggered government industry stakeholders to invest in greener and sustainable technologies as replacement for petroleum-based technologies. For example, in 2005, the biodiesel production was 1.1 billion gallons to prolong the depleting oil-resources. Similarly, manufacturing companies such as Coca Cola have introduced PlantBottle as an alternative to conventional 100% petroleum-based plastics. In 2015, LEGO Inc. announced investment of $150 million to create toys from renewable materials, which are currently prepared from PB along with styrene and acrylonitrile. In addition, government funding agencies such as the NSF have introduced a new funding category known as "SusChem" that sponsors research in sustainable chemistry, engineering, and materials. According to the United States Environmental Protection Agency, there are currently 400+ ecolabel products in the U.S. marketplace compared to 16 ecolabels in 1998. Similarly, the U.S. Federal Government has launched a program known as "Greening Government E-Procurement of Office Supplies" through which the purchase of greener materials are encouraged for office supplies. Thus, the current trends strongly suggest that in the future technologies relying on raw petroleum will become prohibitively expensive and therefore many companies including LEGO Inc. have already started their search for renewable alternatives to PB-based materials.

Polycarbonates (PCs) are one possible alternative. Polycarbonates obtained through the ring opening copolymerization of epoxides and $CO_2$ was first reported in 1968 by Inoue et al. in U.S. Pat. No. 3,585,168. Afterward, several efficient catalysts were reported for the synthesis of polycarbonates including double metal cyanide complex catalysts, Zinc carboxylate catalysts, Zn-based highly efficient catalysts, and bimetallic catalysts. The focus of this previous work was to prepare PCs with a high $T_g$ to accomplish good mechanical properties of value in practical applications.

Recently, Zhang et al. reported epoxy and $CO_2$ derived PC with a $T_g$ of −44° C. However, these PCs have no C=C double bonds and thus do not undergo further copolymerization with styrene and other unsaturated monomers. Though unsaturated polycarbonates (also known as uPCs) have also been reported as being prepared from $CO_2$ and epoxy polymerization, they have a high $T_g$.

uPCs have also been reported in Example 3 of U.S. Pat. No. 9,394,395. However, these uPCs are prepared through energy intensive condensation polymerization using high temperature (180° C.) and high vacuum conditions. In addition, these uPCs include C=C double bonds in the polymer backbone itself as opposed to C=C double bonds as groups pendant from the backbone. Also, the physical properties of such compounds relative to $T_g$ is not reported. Accordingly, there remains an opportunity for improvement.

BRIEF DESCRIPTION OF THE FIGURES

Other advantages of the present disclosure will be readily appreciated, as the same becomes better understood by reference to the following detailed description when considered in connection with the accompanying drawings wherein.

SUMMARY OF THE DISCLOSURE

Figure 1:
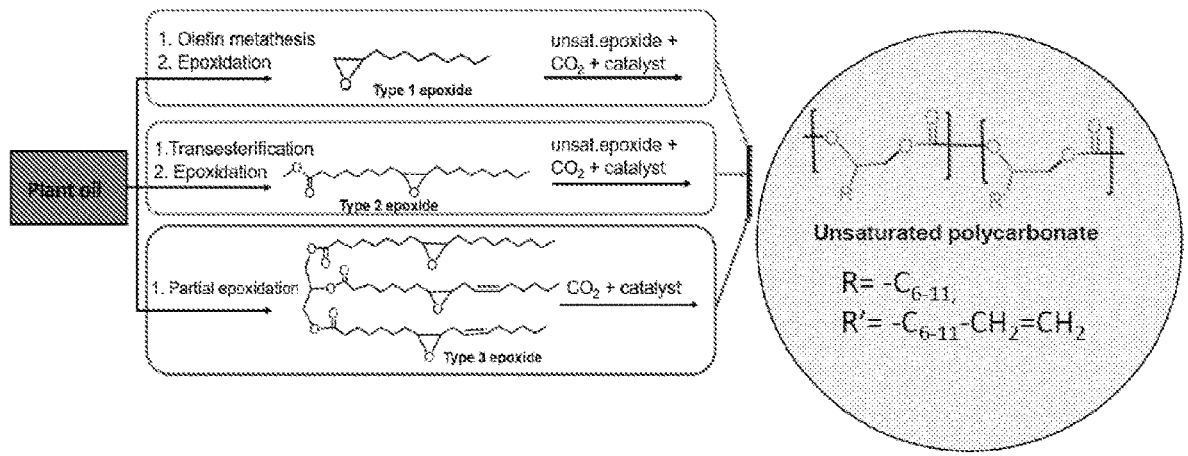
FIG. 1 is a schematic that shows various chemical reactions that are contemplated in embodiments of this disclosure.
Figure 2:
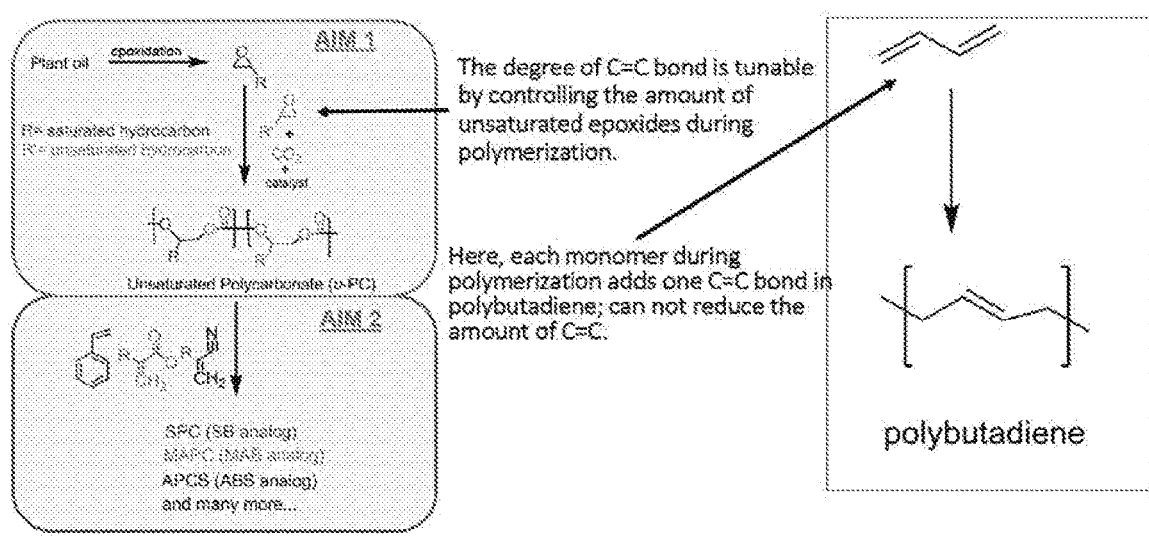
FIG. 2 is a second schematic that shows various chemical reactions that are contemplated in additional embodiments of this disclosure.
Figure 3:
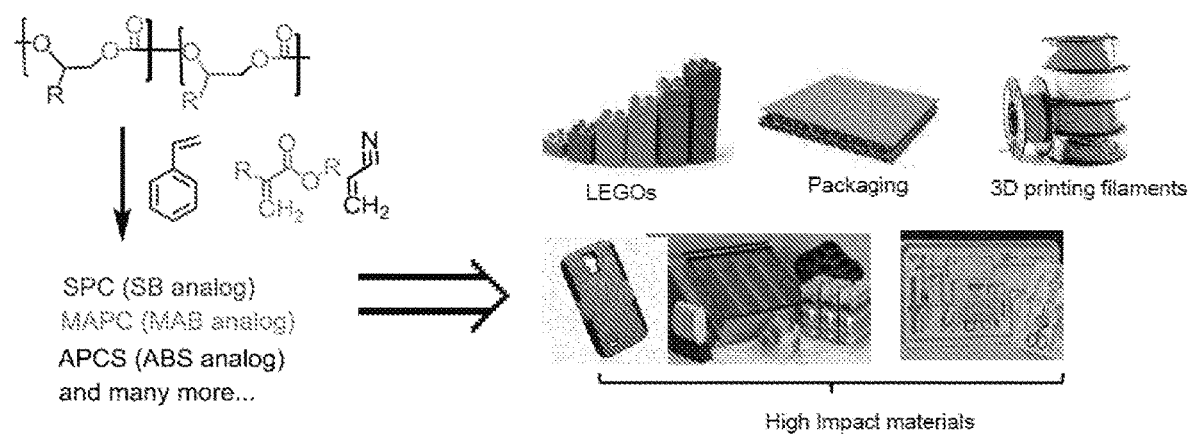
FIG. 3 is a schematic that shows proposed reactions used to form various articles in non-limiting embodiments of this disclosure.

An unsaturated polycarbonate has the structure:

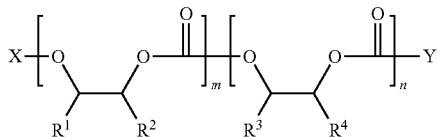

wherein X and Y are each an OH group; one of X and Y is a transition metal and the other of X and Y is an OH group; one of X and Y is an OH group and the other of X and Y is a COOH group, or one or both of X and Y is independently —$NH_2$, —SH, $N_3$, C—C triple bond, C=C, an o-tosylate, or a halogen. In addition, m is 0 to 30,000 and n is 1 to 30,000, so long as (m+n) is 2 or greater. Furthermore, $R^1$ is a $C_3$-$C_{20}$ group that is chosen from a fully-saturated acyclic aliphatic carbon group, a fully-saturated acyclic aliphatic ether group, a fully-saturated acyclic aliphatic ester group, a fully-saturated acyclic aliphatic amide group, an aromatic-aliphatic carbon group without a C=C double bond in the aliphatic chain, an aromatic-aliphatic ether group without a C=C double bond in the aliphatic chain, an aromatic-aliphatic ester group without a C=C double bond in the aliphatic chain, an aromatic-aliphatic amide group without a C=C double bond in the aliphatic chain, or a combination thereof. Moreover, $R^2$ is H or a second $C_3$-$C_{20}$ group that is chosen from a fully-saturated acyclic aliphatic carbon group, a fully-saturated acyclic aliphatic ether group, a fully-saturated acyclic aliphatic ester group, a fully-saturated acyclic aliphatic amide group, an aromatic-aliphatic carbon group having one or more C=C double bonds in the aliphatic chain, an aromatic-aliphatic ether group having one or more C=C double bonds in the aliphatic chain, an aromatic-aliphatic ester group having one or more C=C double bonds in the aliphatic chain, an aromatic-aliphatic amide group having one or more C=C double bonds in the aliphatic chain, or a combination thereof. Also, $R^3$ is optionally a third $C_3$-$C_{20}$ group having one or more C=C terminal and/or internal double bonds and that is chosen from an acyclic aliphatic carbon group, an acyclic aliphatic ether group, an acyclic aliphatic ester group, or an acyclic aliphatic amide group. In addition, $R^4$ is optionally H or a fourth $C_3$-$C_{20}$ group optionally having one or more C=C terminal and/or internal double bonds and that is chosen from an acyclic aliphatic carbon group, an acyclic aliphatic ether group, an acyclic aliphatic ester group, an acyclic aliphatic amide group, or an aromatic group. Alternatively, $R^3$ and $R^4$ form a ring structure having one or more C=C double bonds and having 4 to 20 carbon atoms.

DETAILED DESCRIPTION OF THE DISCLOSURE

This disclosure provides an unsaturated polycarbonate (also known as a "uPC") that can be formed via multiple synthetic routes. The unsaturated polycarbonate has the structure:

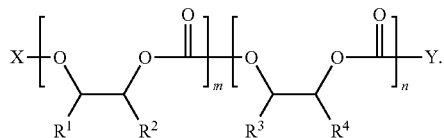

In this structure, there are various options for X and Y. In one embodiment, X and Y are each an OH group, i.e., X=OH and Y=OH. In another embodiment, one of X and Y is a transition metal and the other of X and Y is an OH group, i.e., (X=M and Y=OH) or (X=OH and Y=M), wherein the transition metal may be any known in the art, e.g. scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, or combinations thereof. In still another embodiment, one of X and Y is an OH group and the other of X and Y is a COOH group, i.e., (X=OH and Y=COOH) or (X=COOH and Y=OH). In another embodiment, one or both of X and Y is independently —$NH_2$, —SH, $N_3$, C—C triple bond, C=C, an o-tosylate, or a halogen.

In addition, m is 0 to 30,000 and n is 1 to 30,000, so long as (m+n) is 2 or greater. In various embodiments, m is from 0 to 100, from 101 to 1,000, or from 1,001 to 30,000. In other embodiments, n is from 1 to 100, from 101 to 1,000, or from 1,001 to 30,000. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

Furthermore, $R^1$ is a $C_3$-$C_{20}$ group that is chosen from a fully-saturated acyclic aliphatic carbon group, a fully-saturated acyclic aliphatic ether group, a fully-saturated acyclic aliphatic ester group, or a fully-saturated acyclic aliphatic amide group. Said differently, $R^1$ may be any group above that has 3, 4, 5, 6, 7, 8, 9, 10, 11, 12, 13, 14, 15, 16, 17, 18, 19, or 20, carbon atoms, including any and all isomers thereof. In one embodiment, the group is an acyclic aliphatic carbon group, e.g. an alkyl group or alkenyl group. For example, the group may be an alkyl group having any number of carbon atoms described above, e.g. a C6-C16 or C7-C12 alkyl group, or any isomer thereof. In another embodiment, the group is an acyclic aliphatic ether group, e.g. XO[$(CR^5R^6)_a$—O]$_b$ where a is 1 to 20, b is 1 to 20 and X is H, alkyl, SH, or $NH_2$, $R^5$ is H or Alkyl and $R^6$ is H or alkyl. Alternatively, the group is an acyclic aliphatic ester group, e.g. XO[$(CR^7R^8)_a$—$CO_2$]$_b$ where a is 1 to 20, b is 1 to 20 and X is H, alkyl, SH, or $NH_2$, $R^7$ is H or alkyl and $R^8$ is H. Even further, the group may be an acyclic aliphatic amide group, e.g. an XO[$(CR^5R^8)_a$—NH]$_b$ where a is 1 to 20, b is 1 to 20 and X is H, alkyl, SH, or $NH_2$, $R^5$ is H or alkyl, and $R^8$ is H. Alternatively, $R^1$ is $C_3$-$C_{20}$ having no non-aromatic double bonds is chosen from an aromatic-aliphatic carbon group, an aromatic-aliphatic ether group, an aromatic-aliphatic ester group, an aromatic-aliphatic amide group or a combination thereof. For example, hydrogenated pendant group in cardanol epoxy and their derivatives.

Moreover, $R^2$ is an H atom or may be a second $C_3$-$C_{20}$ group. This second $C_3$-$C_{20}$ group may have any number of carbon atoms as is described above and is chosen independently from $R^1$. This second group may also be a fully-saturated acyclic aliphatic carbon group, a fully-saturated acyclic aliphatic ether group, a fully-saturated acyclic aliphatic ester group, a fully-saturated acyclic aliphatic amide group, an aromatic-aliphatic carbon group having one or more C=C double bonds in the aliphatic chain, an aromatic-aliphatic ether group having one or more C=C double bonds in the aliphatic chain, an aromatic-aliphatic ester group having one or more C=C double bonds in the aliphatic chain, an aromatic-aliphatic amide group having one or more C=C double bonds in the aliphatic chain, or a combination thereof. For example, the group may be an alkyl group having any number of carbon atoms described above, e.g. a C6-C16 or C7-C12 alkyl group, or any isomer thereof. Any of these groups may also be as described above. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

Also, $R^3$ is optionally a third $C_3$-$C_{20}$ group having one or more C=C terminal and/or internal double bonds. This third $C_3$-$C_{20}$ group may have any number of carbon atoms as is described above and is chosen independently from $R^1$ and $R^2$. This third group is chosen from an acyclic aliphatic carbon group, an acyclic aliphatic ether group, an acyclic aliphatic ester group, or an acyclic aliphatic amide group, that have one or more C=C terminal and/or internal double bonds. For example, the group may be an alkyl group having any number of carbon atoms described above and having one or more C=C terminal and/or internal double bonds, e.g. a C6-C16 or C7-C12 alkyl group, or any isomer thereof. One example of a acyclic aliphatic carbon group is 1-nonene ($C_9$). An example of such an acyclic aliphatic ether group is 2-((allyloxy)methyl). Examples of such an acyclic aliphatic ester group are methyl acrylate or acrylate. An example of such an acyclic aliphatic amide group is 1-(ethyl-14-azaneyl)but-3-en-1-one. Alternatively, $R^3$ is $C_3$-$C_{20}$ having one or more double bonds that is chosen from an aromatic-aliphatic carbon group, an aromatic-aliphatic ether group, an aromatic-aliphatic ester group, an aromatic-aliphatic amide group or a combination thereof. For example, the pendant group in unsaturated cardanol epoxy and their derivatives.

In addition, $R^4$ is optionally an H atom or a fourth $C_3$-$C_{20}$ group. This fourth $C_3$-$C_{20}$ group may have any number of carbon atoms as is described above and is chosen independently from $R^1$, $R^2$, and $R^3$. This fourth group optionally has one or more C=C terminal and/or internal double bonds. In other words, this fourth group may include a C=C double bond or may be free of a C=C double bond. This fourth group is chosen from an acyclic aliphatic carbon group, an acyclic aliphatic ether group, an acyclic aliphatic ester group, an acyclic aliphatic amide group, or an aromatic group. Suitable examples of such a fourth group are set forth above.

In other embodiments, $R^3$ and $R^4$ form a ring structure having one or more C=C double bonds and having 4 to 20 carbon atoms. In various embodiments, the ring structure has 5, 6, 7, or 8 carbon atoms. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

In one embodiment, $R^1$ is an alkyl group having 7 to 12 carbon atoms and that is free of a C=C double bond. In another embodiment, $R^2$ is H or an alkyl group having 7 to 12 carbon atoms and that is free of a C=C double bond. In a further embodiment, $R^3$ is an alkyl group having 7 to 12 carbon atoms and having one or more C=C terminal and/or internal double bonds. In still another embodiment, $R^4$ is H.

In various embodiments, the unsaturated polycarbonate has a Tg of from −150 to 0, −100 to 0, −100 to −5, −95 to −5, −90 to −10, −85 to −15, −80 to −20, −75 to −25, −70 to −30, −65 to −35, −60 to −40, or −55 to −50, ° C. The Tg refers to glass transition temperature, as is known in the art. Polymers typically behave like glass at a temperature below their Tg and behave as a rubber at temperatures above their Tg. In this disclosure, the unsaturated polycarbonate tends to behave as glass at temperatures below −100° C. and tends to behave as a rubber at temperatures above 0° C. In various embodiments, the unsaturated polycarbonate will act as a shock absorber (and have high impact resistance) at temperatures above −40° C. as compared to polybutadiene which will show similar behavior at temperatures above −60° C. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

In other embodiments, the unsaturated polycarbonate has zero percent crystallinity and is considered to be totally amorphous and may be described as rubbery.

In some embodiments, the molar ratio of $R^3$ to $R^1$ is from 1:0 to 1:1000 or from 1:0 to 1:1000. In another embodiment, the molar ratio of $R^3$ to $R^1$ is from 1:1 to 1:1000. In other embodiments, the molar ratio of $R^3$ to $R^1$ is from 1:0.1 to 1:200 or from 1:5 to 1:200. In further embodiments, the molar value of $R^3$ in the ratio is 1 while the molar value of $R^1$ in the ratio is from 1 to 1000, 25 to 975, 50 to 950, 75 to 925, 100 to 900; 125 to 875, 150 to 850, 175 to 825, 200 to 800, 225 to 875, 250 to 850, 275 to 825, 300 to 800, 325 to 775, 350 to 750, 275 to 725, 300 to 700, 325 to 675, 350 to 650, 375 to 625, 400 to 600, 425 to 575, 450 to 550, 475 to 525, or 500 to 525. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

In various embodiments, the unsaturated polycarbonate has a weight average molecular weight (Mw) from 2,000 to 1,000,000, from 5,000 to 400,000, from 30,000 to 40,000, from 40,000 to 50,000, or from 30,000 to 50,000, g/mol. In other embodiments, the Mw is from 2,000 to 10,000, from 3,000 to 9,000, from 4,000 to 8,000, from 5,000 to 7,000, or from 6,000 to 7,000, g/mol. In still other embodiments, the Mw is from 10,000 to 90,000, from 20,000 to 80,000, from 30,000 to 70,000, from 40,000 to 60,000, or from 50,000 to 60,000, g/mol. In other embodiments, the Mw is from 100,000 to 900,000, from 200,000 to 800,000, from 300,000 to 700,000, from 400,000 to 600,000, or from 500,000 to 600,000, g/mol. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

Method of Forming the Unsaturated Polycarbonate:

This disclosure also includes a method of forming the unsaturated polycarbonate. In one embodiment, the method includes addition polymerizing $CO_2$ and an epoxy in the presence of a catalyst. The step of additional polymerizing may be further described as reacting a saturated or unsaturated epoxy with gaseous $CO_2$ in the presence of the catalyst. This reaction may occur at a temperature of from 0 to 200, 25 to 150, or 50 to 100, °C. The reaction may occur at any pressure, e.g. at a $CO_2$ pressure of from 1 to 60 atm or 5 to 40 atm. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

The epoxy may be a saturated epoxy or an unsaturated epoxy. The epoxy may include a terminal or internal epoxy group with no C=C. A suitable example of an internal epoxy that is fully saturated is 2,3-dipentyloxirane. A suitable example of an terminal epoxy that is fully saturated is 1,2-epoxydodecane. In other embodiments, the saturated epoxy is chosen from 1,2-epoxy octane, 1,2 epoxy nonane, 1,2 epoxy decane, and combinations thereof. In various embodiments, the unsaturated epoxy is chosen from 1,2-epoxy octene, 1,2 epoxy nonene, 1,2 epoxy decene, glycidyl methacrylate, 2-(pent-4-en-1-yl)-3-pentyloxirane and combinations thereof.

In further embodiments, the epoxy is an unsaturated terminal or internal epoxy that includes one or more terminal or internal C=C groups each chosen from an acyclic aliphatic carbon group, an acyclic aliphatic ether group, an acyclic aliphatic ester group, or an acyclic aliphatic amide group. Non-limiting exemplary examples of such epoxies are 2-((allyloxy)methyl), methyl acrylate (also acrylate), and 1-(ethyl-14-azaneyl)but-3-en-1-one.

In certain embodiments, the unsaturated terminal or internal epoxy has one or more non-aromatic double bonds is chosen from an aromatic-aliphatic carbon group, an aromatic-aliphatic ether group, an aromatic-aliphatic ester group, an aromatic-aliphatic amide group or a combination thereof. A non-limiting example is a cardanol epoxy.

In even further embodiments, the epoxy is a saturated epoxy that does not include C=C terminal and/or internal double bonds and that is chosen from an acyclic aliphatic carbon group, an acyclic aliphatic ether group, an acyclic aliphatic ester group, or an acyclic aliphatic amide group. Non-limiting exemplary examples of such epoxies are 2-epoxyoctane, 1,2-epoxynonane, and 1,2-epoxydodecane.

In certain embodiments, the saturated terminal or internal epoxy has no non-aromatic double bonds is chosen from an aromatic-aliphatic carbon group, an aromatic-aliphatic ether group, an aromatic-aliphatic ester group, an aromatic-aliphatic amide group or a combination thereof. A non-limiting example is a hydrogenated cardanol epoxy.

Typically, the $CO_2$ is utilized in an amount of from 10 to 90, from 20 to 70, or from 30 to 60, weight percent based on a total weight of the uPC. Moreover, the epoxy is typically utilized in an amount of from 10 to 90, from 70 to 20, or from 60 to 40, weight percent based on a total weight of uPC. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

Referring now to the catalyst, the catalyst may be any known in the art to be suitable for such a reaction. In one embodiment, the catalyst is a transition metal catalyst. Non-limiting examples of such catalysts include a SalenCo(III)X catalyst, wherein X is Cl, $CH3COO^-$, or Phenyl-$COO^-$, a double metal cyanide catalyst, a Zinc carboxylate catalyst, a bimetallic catalyst, or a combination thereof. Typically, the catalyst is utilized in an amount of from 0.0001 to 10, from 0.01 to 1, or from 0.1 to 0.5, weight percent based on a total weight of the uPC. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

It is also contemplated that the step of addition polymerizing $CO_2$ and the epoxy occurs in the presence of a co-catalyst. The co-catalyst may also be any known in the art to be suitable for such a reaction. In one embodiment, the co-catalyst is an ionic salt/non-ionic species. For example, the co-catalyst may be bis(triphenylphosphoranylidene)ammonium chloride. In certain cases, the catalyst itself will be having ionic groups that serves essentially the same function, as does a co-catalyst. An example of a catalyst with ionic groups may be (salen)Co(III) complex tethering four quaternary ammonium salts.

Referring back to the method, the epoxy and the $CO_2$ may or may not each be generated from renewable feedstock. The terminology "renewable feedstock" typically describes any renewable, biological material that can be used directly as a reactant or fuel for a reaction, or converted to another form of reactant or energy product. Biomass feedstocks are the plant and algal materials used to derive fuels like ethanol, butanol, biodiesel, and other hydrocarbon fuels. Examples of biomass feedstocks include plant oils (edible and non-edible), cardanol, corn starch, sugarcane juice, crop residues such as corn stover and sugarcane bagasse, purpose-grown grass crops, and woody plants. The $CO_2$ and epoxy of this disclosure may be derived from one or more of the sources set forth above. Alternatively, $CO_2$ may be prepared through combustion or biological processes. Commercially, $CO_2$ may be obtained through the purification of gases from power plants, for example. In one embodiment, the renewable feedstock is further defined as 80% to 100% renewable feedstock. In another embodiment, renewable feedstock is further defined as 100% renewable feedstock.

Article:

This disclosure also provides an article including the free-radical polymerization product of the unsaturated polycarbonate and a monomer having at least one C=C double bond. The monomer may be any known in the art to be suitable for a free-radical polymerization reaction. The monomer may include one or more C=C double bonds and/or C—C triple bonds. In various embodiments, the monomer is chosen from aromatic monomers having at least one C=C double bond, (meth)acrylates, nitriles, vinyl compounds, allylic compounds, and combinations thereof.

In various embodiments, the terminology "monomer" describes a compound that can be further polymerized. For that reason, in some embodiments, the "monomer" is actually an oligomer or polymer that can be further polymerized. For example, the monomer can have one or more functional groups, e.g. 1, 2, 3, 4, 5, 6, 7, 8, 9, 10 or up to 100 or more, that can polymerize by free radical initiation such as aliphatic, aromatic, cycloaliphatic, arylaliphatic, heterocyclic moiety(ies), or any combination thereof. Examples of polyfunctional materials include dendritic polymers such as dendrimers, linear dendritic polymers, dendrigraft polymers, hyperbranched polymers, star branched polymers, and hypergraft polymers. The dendritic polymers may include one type of polymerizable functional group or different types of polymerizable functional groups, for example, acrylates and methacrylate functions. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

Non-limiting examples of suitable "monomers" include acrylates and methacrylates such as isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloyl morpholine, (meth)acrylic acid, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, caprolactone acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, tridecyl (meth)acrylate, undecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylamide, beta-carboxyethyl (meth)acrylate, phthalic acid (meth)acrylate, dimethylaminoethyl (meth)acrylate, diethylaminoethyl (meth)acrylate, butylcarbamethyl (meth)acrylate, n-isopropyl (meth)acrylamide fluorinated (meth)acrylate, 7-amino-3,7-dimethyloctyl (meth)acrylate.

Non-limiting examples of suitable multifunctional monomers include those with (meth)acryloyl groups such as trimethylolpropane tri(meth)acrylate, pentaerythritol (meth)acrylate, ethylene glycol di(meth)acrylate, bisphenol A diglycidyl ether di(meth)acrylate, dicyclopentadiene dimethanol di(meth)acrylate, [2-[1,1-dimethyl-2-[(1-oxoallyl)oxy]ethyl]-5-ethyl-1,3-dioxan-5-yl]methyl acrylate; 3,9-bis(1,1-dimethyl-2-hydroxyethyl)-2,4,8,10-tetraoxaspiro[5.5-]undecane di(meth)acrylate; dipentaerythritol monohydroxypenta(meth)acrylate, propoxylated trimethylolpropane tri(meth)acrylate, propoxylated neopentyl glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, phosphoric acid mono- and di(meth)acrylates, C7-C20 alkyl di(meth)acrylates, tris(2-hydroxyethyl)isocyanurate tri(meth)acrylate, tris(2-hydroxyethyl)isocyanurate di(meth)acrylate, tricyclodecane diyl dimethyl di(meth)acrylate and alkoxylated versions (e.g., ethoxylated and/or propoxylated) of any of the preceding monomers, and triethylene glycol divinyl ether, and adducts of hydroxyethyl acrylate.

In one embodiment, the monomer is a multifunctional (meth)acrylate. The multifunctional (meth)acrylates may include all methacryloyl groups, all acryloyl groups, or any combination of methacryloyl and acryloyl groups. In an embodiment, monomer is chosen from propoxylated trimethylolpropane tri(meth)acrylate, and propoxylated neopentyl glycol di(meth)acrylate, and any combination thereof. In another embodiment, the multifunctional (meth)acrylate is chosen from trimethylolpropane tri(meth)acrylate, ethylene glycol di(meth)acrylate, propoxylated trimethylolpropane tri(meth)acrylate, propoxylated neopentyl glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, and combinations thereof.

In a typical embodiment, the multifunctional (meth)acrylate has more than 2, more typically more than 3, and more typically greater than 4 functional groups. In another typical embodiment, the monomer consists exclusively of a single multifunctional (meth)acrylate component. In another embodiment, monomer is chosen from dicyclopentadiene dimethanol diacrylate, [2-[1,1-dimethyl-2-[(1-oxoallyl)oxy]ethyl]-5-ethyl-1,3-dioxan-5-yl]methyl acrylate, propoxylated trimethylolpropane triacrylate, and propoxylated neopentyl glycol diacrylate, and any combination thereof.

In other embodiments, the monomer includes one or more of dicyclopentadiene dimethanol di(meth)acrylate, propoxylated trimethylolpropane tri(meth)acrylate, and/or propoxylated neopentyl glycol di(meth)acrylate. In other embodiments, the monomer is a multifunctional (meth)acrylate. A single type or more than one type of (meth)acrylate may be used. In various embodiments, the monomer is further defined as a (meth)acrylate monomer which can be any monomer having at least one acrylate functional group and/or at least one methacrylate functional group. In other words, the terminology "(meth)" describes that the "meth" group is optional and not required. Thus, the monomer may be an "acrylate" monomer (without a methyl group) or a "methacrylate" monomer that includes a methyl group. It is typical that the (meth)acrylate monomer can be chosen from aliphatic acrylates, aliphatic methacrylates, cycloaliphatic acrylates, cycloaliphatic methacrylates, and combinations thereof. The alkyl radicals of these compounds can include up to 20 carbon atoms.

The aliphatic acrylates may be chosen from methyl acrylate, ethyl acrylate, propyl acrylate, n-butyl acrylate, iso-butyl acrylate, tert-butyl acrylate, hexyl acrylate, 2-ethylhexyl acrylate, iso-octyl acrylate, iso-nonyl acrylate, iso-pentyl acrylate, tridecyl acrylate, stearyl acrylate, lauryl acrylate, and mixtures thereof. The aliphatic methacrylates may be chosen from methyl methacrylate, ethyl methacrylate, propyl methacrylate, n-butyl methacrylate, iso-butyl methacrylate, tert-butyl methacrylate, hexyl methacrylate, 2-ethylhexyl methacrylate, iso-octyl methacrylate, iso-nonyl methacrylate, iso-pentyl methacrylate, tridecyl methacrylate, stearyl methacrylate, lauryl methacrylate, and mixtures thereof. The cycloaliphatic acrylate that may be selected as one of the (meth)acrylate monomers is cyclohexyl acrylate, and the cycloaliphatic methacrylate that may be selected as one of the (meth)acrylate monomers is cyclohexyl methacrylate.

In various embodiments, the unsaturated polycarbonate and the monomer are reacted in an amount of from 1 to 99, from 10 to 99, or from 30 to 70 in weight percent based on the total weight of the end product. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

Referring back to the article itself, the article may be further defined as a coating, packaging, high impact materials, toys, filaments, etc. In various embodiments, the article has a durometer of 30 to 80 Shore A, Young's modulus of 1 MPa to 100 GPa, a tensile strength of 1 MPa to 100 GPa, and an elongation of 2% to 4000%. In various non-limiting embodiments, all values and ranges of values, both whole and fraction, between and including the aforementioned values are hereby expressly contemplated. In various embodiments, any one or more of the aforementioned amount(s) may vary by ±1, 2, 3, 4, 5, 6, 7, 8, 9, or 10, %.

Method of Forming the Article:

This disclosure also provides a method of forming the article. The method includes the step of free-radical polymerizing the unsaturated polycarbonate and the monomer having the at least one C=C double bond to form the article. This polymerization may utilize any free-radical generating catalyst (e.g. a free-radical initiator), heat, UV light, etc. In various embodiments, the free radical initiator is chosen from peroxides, azo compounds, and combinations thereof. In other embodiments, the free radical initiator is chosen from 4,4'-azobis(4-cyanovaleric acid), 1,1'-azobis(cyclohexanecarbonitrile), azobisisobutyronitrile, 2,2'-azobis(2-methylpropionamidine) dihydrochloride, 2,2'-azobis(2-methylpropionitrile), ammonium persulfate, hydroxymethanesulfinic acid monosodium salt dehydrate, potassium persulfate, sodium persulfate reagent grade, tert-butyl hydroperoxide solution, tert-butyl peracetate, cumene hydroperoxide, 2,5-di(tert-butylperoxy)-2,5-dimethyl-3-hexyne, dicumyl peroxide, 2,5-bis(tert-butylperoxy)-2,5-dimethyl hexane, 2,4-pentanedione peroxide, 1,1-bis(tert-butylperoxy)-3,3,5-trimethylcyclohexane, benzoyl peroxide, 2-butanone peroxide, tert-butyl peroxide, lauroyl peroxide, tert-butyl peroxybenzoate, tert-butylperoxy 2-ethylhexyl carbonate, tert-butyl hydroperoxide solution, and combinations thereof. In one embodiment, the free-radical initiator is azobisisobutyronitrile (AIBN). In another embodiment, the free-radical initiator is benzoyl peroxide (BPO).

In one embodiment, the step of free-radical polymerizing is further defined as bulk co-polymerizing the unsaturated polycarbonate and the monomer. In another embodiments, the step of free-radical polymerizing is further defined as co-polymerizing the unsaturated polycarbonate and the monomer in water. In a further embodiment, the step of free-radical polymerizing is further defined as co-polymerizing the unsaturated polycarbonate and the monomer in an organic solvent. As is known in the art, bulk polymerization typically utilizes a reaction mixture that includes only initiator and monomer and no solvent.

ADDITIONAL EMBODIMENTS

In additional embodiments, the uPC is described as rubbery and is prepared under mild conditions via the addition polymerization of $CO_2$, epoxy (saturated) and epoxy (unsaturated). Also, in various embodiments, the C=C double bonds are located as pendent groups. In still other embodiments, the uPCs are described relative to their low Tg values and their fully amorphous nature that renders them rubber-like properties at sub-zero Celsius temperatures. In even further embodiments, the rubbery uPCs is copolymerized with various unsaturated monomers. These copolymerizations can be accomplished in the emulsion, bulk, and solvent.

The uPC may alternatively be described as a novel rubbery polycarbonate (RPC) that replicates the properties of polybutadiene (PB). For example, both RPCs and PB tend to be rubbery materials at −40° C. In addition, both materials can undergo copolymerization with styrene to form HIPS. However, RPCs are more useful than PB in several aspects: 1) In contrast with PB, RPCs are typically derived from renewable resources and thus they tend to be sustainable, 2) RPCs tend to not be subject to unpredictable costs because they are typically derived from plant and $CO_2$ feedstocks, and 3) the anticipated production costs of RPC-based HIPS can be as little as one third that of PB-based HIPS.

In various embodiments, the RPC-based HIPS exhibit comparable impact-resistance performance with that of PB-based HIPS. This may be evaluated using a notched izod impact test (ASTM D256) and a tensile test (ASTM D882) to measure impact strength and stiffness, elongation and tensile strengths of RPC-HIPS, PB-HIPS and STYRON® 484. STYRON® 484 is a commercial-grade HIPS resin and therefore can be included for a comparative performance analysis as a second control along with the PB-HIPS. To prepare sheets and rods for the impact and tensile tests, RPC-HIPS and PB-HIPS materials can initially be prepared via compression molding.

The Izod impact test determines the impact force required to break a plastic rod/sheet of a particular thickness. The impact tests data obtained for RPC-HIPS, PB-HIPS, and STYRON® 484 can be used to determine the comparative impact strength (performance) of the compounds of this disclosure relative to the reference materials. This test can be used to evaluate the cost and the aesthetic appeal of the product to the customer. For example, if RPC-HIPS has double the impact resistance relative to the reference PB-HIPS, a mobile device case made of RPC-HIPS will provide similar impact protection at half the thickness in comparison to a case made of PB-HIPS. Consequently, much less material would be required to prepare cases/sheets when the thickness is reduce by half, thus potentially reducing the cost by a factor of nearly two. In addition, thinner protective cases tend to be more appealing to the consumer from both an aesthetic and ergonomics perspective.

In various embodiments, a two-step synthetic procedure will be used to produce RPC-HIPS in large quantities. In step 1, an initial amount of the RPCs will be prepared. In step 2, these RPCs will be copolymerized with styrene. Similarly, commercially available PB (Mw=200,000 g/mol) can be used and can be copolymerized with styrene to prepare reference PB-HIPS in bulk.

In further embodiments, two fundamental feedstocks for the RPCs are $CO_2$ and plant oil-derived long chain epoxies. $CO_2$ is readily available from Airgas and other gas suppliers at relatively low costs. Meanwhile, long chain epoxies such as 1,2-epoxydodecane and 1,2-epoxydecane are typically derived from plant oils using methods similar to that for low molecular weight biodiesel production. In the case of biodiesel, plant oils are subjected to sequential transesterification, olefin metathesis, and hydrogenation reactions. Meanwhile, relative to the instant disclosure, plant oils can be subjected to sequential transesterification, olefin metathesis, and subsequently to epoxidation. Besides transesterification and metathesis, the epoxidation of alkenes is a well-established commercial practice. Thus, the feedstocks (i.e., $CO_2$ and plant oils (edible and non-edible)) are not only inexpensive and renewable but the commercial production of these materials is already operational, and thus the commercial-scale production of this technology is highly feasible.

In additional embodiments, extrusion-thermoforming and extrusion-compression molding can be used to prepare the article, e.g. as cases for electronics. The manufacturing of these articles may serve multiple purposes. First, it will validate that the RPC-HIPS are machine processable, in that case it will demonstrate the viability of commercial scale production of RPC-HIPS-based consumer items. Second, this will also help to calculate the cost per article considering the amount of RPC-HIPS resin used per article. Thirdly, the data collected in all three milestones can be used to develop a strategy for preliminary pilot-scale production.

In even further embodiments, the technology of this disclosure offers green and sustainable substitutes to the currently used HIPS, which are produced on an annual scale of 6.3 million tons. The production cost can be as low as one-third that of the currently used PB-HIPS (HIPS). This technology can also be readily adopted and integrated into the existing production lines because RPC-HIPS can be processed with the very same machinery that is currently used for HIPS processing. Thus, a lower production cost, sustainable and renewable properties, and facile integration into the production line will allow this technology to dominate the existing market of high-impact materials used for electronic protective casings, toys, and chilled-item packaging trays.

EXAMPLES

Examples 1-7: Synthesis of Various uPCs

A general procedure used for the synthesis of uPCs is described below and described in Table 1. Catalyst (salen) Co(III)-Cl and cocatalyst PPNCl are loaded into a high-pressure reactor. The system is sealed and briefly vacuumed, and refilled by the addition of $N_2$ gas. To this reactor, epoxide (saturated) and epoxide (unsaturated) are added under a gentle flow of $N_2$. The system is capped, and filled with $CO_2$ until 150 psi is achieved and then the system is stirred at room temperature. After 6 h, $CO_2$ is vented, and to the resultant crude uPC is added THF (3.0 ml). Then this mixture is poured into methanol (50 ml) and the resultant turbid solution is centrifuged at 4500 rpm for 5 min. The resultant uPC is obtained as a viscous liquid, which is dried under vacuum at 50° C. for overnight.

TABLE 1

| Example | Epoxy (saturated) | Epoxy (unsaturated) | Cat/ CoCat. | CO2 (psi) | C=C mol % | $T_g$ ° C. |
|---|---|---|---|---|---|---|
| 1 | Epoxy dodecane (2.3 ml) | Epoxy 9-decene (0.57 ml) | 20 mg/ 20 mg | 150 | 40% | −40 |
| 2 | Epoxy dodecane (6.7 ml) | Epoxy 9-decene (1.7 ml) | 50 mg/ 50 mg | 150 | 20% | — |
| 3 | — | Epoxy 9-decene (5.0 ml) | 20 mg/ 20 mg | 150 | 100% | −46.5 |
| 4 | Epoxy octane (6.7 ml) | Epoxy 9-decene (1.57) | 20 mg/ 20 mg | 150 | 20% | −35 |
| 5 | Epoxy octane (2.4 ml) | Epoxy 9-decene (1.15 ml) | 22 mg/ 20 mg | 150 | 40% | — |
| 6 | Epoxyoctane (2 mL) | GMA (0.2 mL) | 23 mg/ 20 mg | 150 | 10% | — |
| 7 | epoxyoctane (4.6 mL) | GMA (0.8 mL) | 22 mg/ 20 mg | 150 | 18% | — |

Examples 8-9: Standard Polybutadiene-Styrene Copolymers—Preparation in Solvent

Polybutadiene (PB) graft copolymers are prepared by the following free radical polymerization procedure as described below in Table 2. PB (purchased commercially) and styrene are mixed together. This solution is diluted with toluene and subsequently degassed using freeze-pump-thaw cycles. The degassed mixture is combined with a free radical initiator and is subsequently heated at 68° C. for 48 hrs.

Examples 10-11: Preparation of uPC Copolymers in Solvent uPC graft copolymers are prepared by the following free radical polymerization procedure as described below in Table 2. uPC and styrene are mixed together. This solution is diluted with toluene and subsequently degassed using freeze-pump-thaw cycle before addition of the free radical initiator. The reaction mixture is subsequently heated at 65° stirred for 48 hrs. All reagents are mixed as shown in Table 2 below.

TABLE 2

| Ingredient | Example 8 | Example 9 | Example 10 | Example 11 |
|---|---|---|---|---|
| uPC or PB | 0.25 g polybutadiene | 0.25 g polybutadiene | 0.25 g uPC from Example 2 | 0.25 g uPC from Example 2 |
| Free-Radical Initiator | 11 mg (AIBN) | 16 mg (BPO) | 11 mg (AIBN) | 16 mg (BPO) |
| Styrene | 1 mL | 1 mL | 1 mL | 1 mL |
| Benzene | 10 mL | 10 mL | 10 mL | 10 mL |
| Degree of Monomer Conversion at 65° C. for 48 hrs | 51% | 53% | 63% | 43% |
| % Grafting | 1.6 | 1.7 | 0.60 | 1.9 |
| $T_g$ | 94.3 | 84.12 | 72.9 | 83.98 |

Examples 12-13: Preparation of Polycarbonate Copolymers in (Mini) Emulsions

Figure 4:
FIG. 4 is a photograph of the latex from Example 12, both before and after precipitation.

First, a uPC is dissolved in vinyl monomers in a two-neck flask and degassed, as set forth in Table 3 below. To this mixture, a predegassed aqueous sodium dodecyl sulfate (SDS) solution is added that results in a biphasic mixture. This biphasic mixture is then ultrasonicated to obtain ~300 nm droplets stabilized with SDS. Ammonium persulfate is added to the above miniemulsion at 70° C. to initiate the polymerization. The growing polymer chain in the nanodroplet either attacks the C=C bonds of the uPC or abstracts a proton from the allylic carbon of the uPC to generate a free-radical, which in turn will initiate the growth of a new polymer chain from the PC backbone. In either scenario, vinyl polymer chains are grafted in a crisscross pattern onto the PC copolymers to generate PC copolymers latex. Latex from Example 12, both before and after precipitation, is shown in FIG. 4.

TABLE 3

| Ingredient | Example 12 | Example 13 |
|---|---|---|
| u-PC | 0.5 g uPC from Example 1 | 0.5 g uPC from Example 1 |
| Styrene/acrylonitrile | 1.3 ml/0.6 ml Degassing | 1.3 ml/0.0 |
| Water and detergents | 16 g:0.3 g Ultrasonication 5 min | 16 g:0.3 g |
| Ammonium persulfate | 31 mg | 31 |

TABLE 3-continued

| Ingredient | Example 12 | Example 13 |
|---|---|---|
| Heated @70 C. for 2 h | | |
| Degree of grafting | 7% | Not calculated |
| Particle size | 300 nm | 300 nm |

Example 14. Preparation of PC Copolymers in Bulk

A uPC (2 g, C═C 20 mol %), styrene (5.2 mL) and benzoyl peroxide (30 mg) are mixed. The resultant mixture is degassed via freeze pump thaw cycles (three times). This reaction mixture is then heated at 100° C. for 4 hrs, and 150° C. for 12 hrs. As a result, the partially cross-linked polymer is obtained, which yields viscous fluid on the addition of dichloromethane. This semi-crosslinking is a strong indication of the uPC participation in the free radical copolymerization.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure. In various non-limiting embodiments, all values and ranges of values between and including the aforementioned values are hereby expressly contemplated.

One or more of the values described above may vary by ±5%, ±10%, ±15%, ±20%, ±25%, etc. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. An unsaturated polycarbonate having the structure:

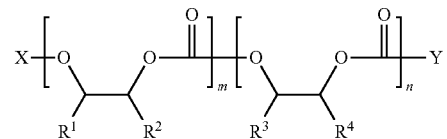

wherein:
X is H and Y is an OH group;
X is a transition metal and Y is an OH group;
Y is a transition metal and X is H;
Y is an OH group and X is a COOH group;
X is H and Y is a COOH group; or
one or both of X and Y is independently —NH$_2$, —SH, N$_3$, C—C triple bond, C═C, an o-tosylate, or a halogen;
wherein the molar ratio of R$^3$ to R$^1$ is from 1:0.1 to 1:200;
wherein m is 1 to 30,000 and n is 1 to 30,000;
wherein R$^1$ is a C$_3$-C$_{20}$ group that is chosen from a fully-saturated acyclic aliphatic carbon group, a fully-saturated acyclic aliphatic ether group, a fully-saturated acyclic aliphatic ester group, a fully-saturated acyclic aliphatic amide group, an aromatic-aliphatic carbon group without a C═C double bond in the aliphatic chain, an aromatic-aliphatic ether group without a C═C double bond in the aliphatic chain, an aromatic-aliphatic ester group without a C═C double bond in the aliphatic chain, an aromatic-aliphatic amide group without a C═C double bond in the aliphatic chain, or a combination thereof;
wherein R$^2$ is H or a second C$_3$-C$_{20}$ group that is chosen from a fully-saturated acyclic aliphatic carbon group, a fully-saturated acyclic aliphatic ether group, a fully-saturated acyclic aliphatic ester group, or a fully-saturated acyclic aliphatic amide group; and
wherein R$^3$ is an alkyl group having 6 to 16 carbon atoms and having one or more C═C terminal and/or internal double bonds; and
wherein R$^4$ is H.

2. The unsaturated polycarbonate of claim 1 wherein R$^1$ is an alkyl group having 6 to 16 carbon atoms and that is free of a C═C double bond.

3. The unsaturated polycarbonate of claim 1 wherein R$^2$ is H or an alkyl group having 6 to 16 carbon atoms and that is free of a C═C double bond.

4. The unsaturated polycarbonate of claim 1 having a Tg of from −100° C. to 0° C.

5. The unsaturated polycarbonate of claim 1 that has zero percent crystallinity.

6. The unsaturated polycarbonate of claim 1 having a weight average molecular weight (Mw) is from 2,000 to 1,000,000 g/mol.

7. The unsaturated polycarbonate of claim 1 having a weight average molecular weight (Mw) is from 2,000 to 80,000 mol.

8. The unsaturated polycarbonate of claim 1 having a weight average molecular weight (Mw) is from 30,000 to 50,000 g/mol.

9. A method of forming the unsaturated polycarbonate of claim 1, the method comprising the step of addition polymerizing $CO_2$ and an epoxy in the presence of a catalyst.

10. The method of claim 9 wherein the epoxy comprises a terminal or internal saturated epoxy.

11. The method of claim 9 wherein the epoxy comprises a terminal or internal unsaturated epoxy.

12. The method of claim 9 wherein the step of addition polymerizing occurs at a $CO_2$ pressure of from 1 to 60 atm.

13. The method of claim 9 wherein the step of addition polymerizing occurs at a $CO_2$ pressure of from 5 to 40 atm.

14. The method of claim 9 wherein the epoxy is an unsaturated epoxy that comprises one or more terminal or internal groups each chosen from an acyclic aliphatic carbon group, an acyclic aliphatic ether group, an acyclic aliphatic ester group, an acyclic aliphatic amide group, or an aromatic-aliphatic derivative thereof.

15. The method of claim 14 wherein the unsaturated epoxy is chosen from 1,2-epoxy octene, 1,2 epoxy nonene, 1,2 epoxy decene, epoxidized cardanol, glycidyl methacrylate and combinations thereof.

16. The method of claim 9 wherein the epoxy is an unsaturated epoxy that comprises one or more terminal or internal groups each having one or more C=C terminal and/or internal double bonds and that is chosen from an acyclic aliphatic carbon group, an acyclic aliphatic ether group, an acyclic aliphatic ester group, or an acyclic aliphatic amide group.

17. The method of claim 16 wherein the saturated epoxy is chosen from 1,2-epoxy octane, 1,2 epoxy nonane, 1,2 epoxy decane, hydrogenated epoxidized cardanol, and combinations thereof.

18. The method of claim 9 wherein the catalyst is a transition metal catalyst.

19. The method of claim 9 wherein the catalyst is a SalenCo(III)X catalyst, wherein x is Cl, $CH_3COO^-$, or PhenylCOO$^-$, a double metal cyanide catalyst, a Zinc carboxylate catalyst, a bimetallic catalyst, or a combination thereof.

20. The method of claim 9 wherein the step of addition polymerizing $CO_2$ and the epoxy occurs in the presence of a co-catalyst.

21. The method of claim 20 wherein the co-catalyst is an ionic salt/non-ionic species.

22. The method of claim 9 wherein the epoxy and the $CO_2$ are each generated from renewable feedstock.

23. The method of claim 22 wherein the renewable feedstock is further defined as 80% to 100% renewable feedstock.

24. The method of claim 22 wherein the renewable feedstock is further defined as 100% renewable feedstock.

25. A method of forming an article, the method comprising:
a step of free-radical polymerizing an unsaturated polycarbonate of claim 1 and a monomer having at least one C=C double bond.

26. The method of claim 25 wherein the step of free-radical polymerizing is further defined as bulk co-polymerizing the unsaturated polycarbonate and the monomer.

27. The method of claim 25 wherein the step of free-radical polymerizing is further defined as co-polymerizing the unsaturated polycarbonate and the monomer in water.

28. The method of claim 25 wherein the step of free-radical polymerizing is further defined as co-polymerizing the unsaturated polycarbonate and the monomer in an organic solvent.

29. The unsaturated polycarbonate of claim 1, wherein:
the unsaturated polycarbonate has a Tg of from −100° C. to 0° C.; and
the unsaturated polycarbonate has zero percent crystallinity.

30. The unsaturated polycarbonate of claim 29, wherein:
$R^1$ is an alkyl group having 6 to 16 carbon atoms and that is free of a C=C double bond; and
$R^2$ is H or an alkyl group having 6 to 16 carbon atoms and that is free of a C=C double bond.

31. The unsaturated polycarbonate of claim 1, wherein:
$R^1$ is an alkyl group having 6 to 16 carbon atoms and that is free of a C=C double bond; and
$R^2$ is H or an alkyl group having 6 to 16 carbon atoms and that is free of a C=C double bond.

* * * * *